(12) United States Patent
Del Missier et al.

(10) Patent No.: US 10,288,096 B2
(45) Date of Patent: May 14, 2019

(54) JOINT ASSEMBLY FOR PIECE OF FURNITURE AND PIECE OF FURNITURE

(71) Applicant: TECNO S.p.A., Milan (IT)

(72) Inventors: Daniele Del Missier, Milan (IT); Giuliano Mosconi, Milan (IT)

(73) Assignee: TECNO S.p.A., Milan (IT)

( * ) Notice: Subject to any disclaimer, the term of this patent is extended or adjusted under 35 U.S.C. 154(b) by 0 days.

(21) Appl. No.: 15/480,690

(22) Filed: Apr. 6, 2017

(65) Prior Publication Data
US 2017/0292549 A1    Oct. 12, 2017

(30) Foreign Application Priority Data

Apr. 8, 2016   (IT) .......................... 102016000036551

(51) Int. Cl.
| | | |
|---|---|---|
| *F16B 3/00* | (2006.01) | |
| *F16B 1/00* | (2006.01) | |
| *F16B 12/10* | (2006.01) | |
| *A47B 13/00* | (2006.01) | |
| *A47B 13/02* | (2006.01) | |

(Continued)

(52) U.S. Cl.
CPC .............. *F16B 3/00* (2013.01); *A47B 13/003* (2013.01); *A47B 13/021* (2013.01); *F16B 1/00* (2013.01); *F16B 7/20* (2013.01); *F16B 12/10* (2013.01); *F16B 12/34* (2013.01); *F16B 12/52* (2013.01); *A47B 2013/022* (2013.01);

(Continued)

(58) Field of Classification Search
CPC . A47B 13/02; A47B 13/003; A47B 2013/006; F16B 3/00; F16B 1/00; F16B 7/0446; F16B 7/025; F16B 12/42

USPC ............ 108/158.12, 158.11, 153.1, 180, 186
See application file for complete search history.

(56) References Cited

U.S. PATENT DOCUMENTS

| | | | |
|---|---|---|---|
| 135,655 A | | 2/1873 | Miller et al. |
| 3,726,551 A | * | 4/1973 | Levenberg ............. A47B 47/00 403/172 |

(Continued)

FOREIGN PATENT DOCUMENTS

| | | |
|---|---|---|
| DE | 10 2005 028 573 A1 | 12/2006 |
| GB | 273 054 A | 6/1927 |
| WO | 2013/187020 A1 | 12/2013 |

OTHER PUBLICATIONS

Italian Search Report for corresponding Italian Patent Application No. 102016000036551 dated Sep. 28, 2016, 8 pgs.

*Primary Examiner* — Jose V Chen
(74) *Attorney, Agent, or Firm* — Merchant & Gould P.C.

(57) ABSTRACT

A joint assembly includes a structural body having a key which projects cantilevered from an abutment surface. The key includes a stem with a first stem portion having a reduced transverse encumbrance, and a second stem portion from which fins project and define locking surfaces. A seat body includes an abutment counter-surface facing the abutment surface. A seat is formed by opening from the abutment counter-surface, which delimits a key entry slot. A first seat portion proximate the entry slot allows insertion of the key if the fins are aligned with the entry slot. A second seat portion internal and opposite the entry slot widens to allow free rotation of the key. The seat body forms locking counter-surfaces having an inclined plane portion moving away from the entry slot so that key rotation brings the abutment surface in force-contact against the abutment counter-surface, creating a firm frictional fit.

15 Claims, 12 Drawing Sheets

(51) Int. Cl.
*F16B 12/34* (2006.01)
*F16B 12/52* (2006.01)
*F16B 7/20* (2006.01)
*F16B 7/04* (2006.01)

(52) U.S. Cl.
CPC ......... *A47B 2230/07* (2013.01); *F16B 7/0446* (2013.01); *F16B 2001/0035* (2013.01)

(56) References Cited

U.S. PATENT DOCUMENTS

| | | | | |
|---|---|---|---|---|
| 3,731,958 A * | 5/1973 | Offenbroich | .......... | F16B 7/0446 403/280 |
| 3,966,340 A * | 6/1976 | Morris | .................... | F16B 12/22 108/156 |
| 4,161,375 A * | 7/1979 | Murphy | ................. | F16B 7/0446 403/169 |
| 4,413,570 A * | 11/1983 | Haigh | .................... | A47B 13/08 108/156 |
| 4,516,376 A * | 5/1985 | King | ................. | A47B 47/0008 403/171 |
| 4,630,550 A * | 12/1986 | Weitzman | ............... | A47B 13/06 108/155 |
| 5,403,043 A | 4/1995 | Smet | | |
| 5,899,423 A * | 5/1999 | Albertini | ................ | A47B 13/02 248/188.8 |
| 5,934,203 A * | 8/1999 | Glass | .................... | A47B 13/003 108/156 |
| 6,047,648 A * | 4/2000 | Alm | ..................... | A47B 13/021 108/157.16 |
| 6,062,761 A * | 5/2000 | Allen | .................. | A47B 47/0008 403/170 |
| 6,332,657 B1 * | 12/2001 | Fischer | .............. | A47B 47/0008 312/111 |
| 6,450,107 B1 * | 9/2002 | Sanz Novales | ...... | A47B 13/003 108/153.1 |
| 6,598,435 B2 * | 7/2003 | Cowan | .................. | E05B 35/008 411/549 |
| 6,925,945 B2 * | 8/2005 | Babick | ................. | A47B 13/021 108/156 |
| 7,040,835 B2 * | 5/2006 | Sun | ...................... | A47B 13/021 108/147.12 |
| 7,883,288 B2 * | 2/2011 | Jorna | .................... | F16B 7/0453 403/171 |
| 8,671,644 B2 * | 3/2014 | Huang | ................... | A47B 13/06 108/155 |
| 2006/0278139 A1 | 12/2006 | Korb | | |
| 2008/0072515 A1 | 3/2008 | Huhnerbein | | |
| 2010/0014912 A1 | 1/2010 | Keyvanloo | | |
| 2013/0220188 A1 | 8/2013 | Wei Siao | ............... | A47B 13/02 108/158.11 |
| 2015/0208798 A1* | 7/2015 | Glenn, II | ............... | A47B 13/02 108/158.11 |
| 2017/0156486 A1* | 6/2017 | Blick | ....................... | A47B 3/06 |
| 2017/0172292 A1* | 6/2017 | Steelman | ............... | A47B 13/02 |

* cited by examiner

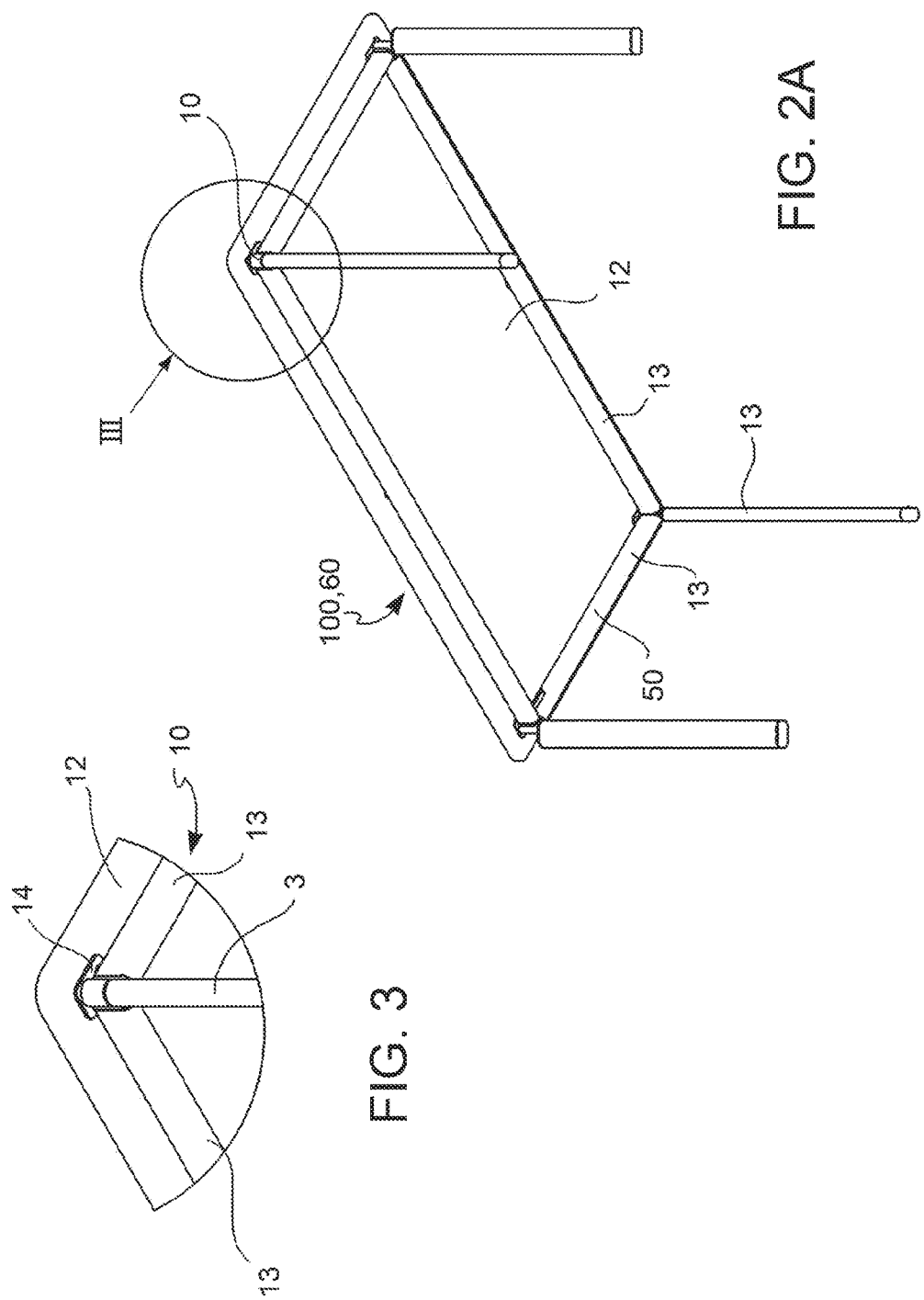

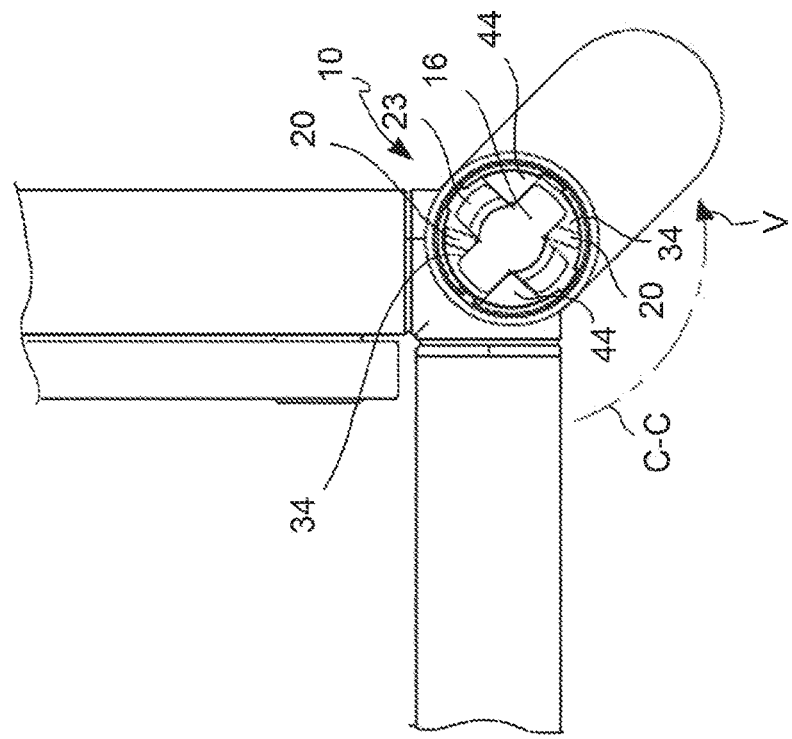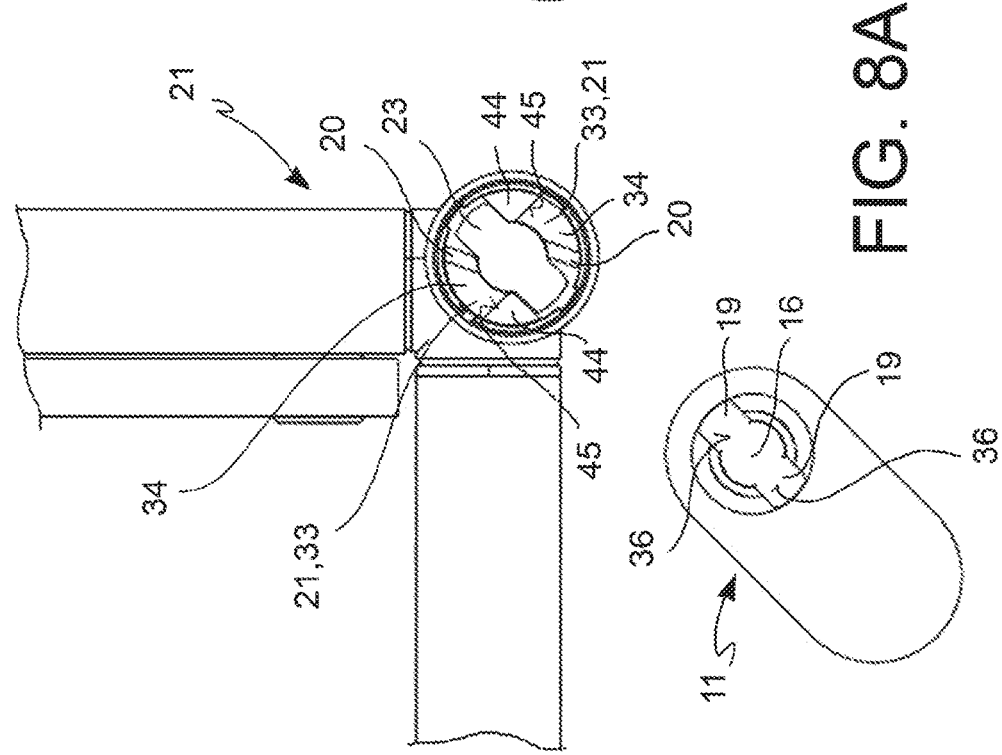

JOINT ASSEMBLY FOR PIECE OF FURNITURE AND PIECE OF FURNITURE

This application claims benefit of Serial No. 102016000036551, filed on 8 Apr. 2016 in Italy and which application is incorporated herein by reference. To the extent appropriate, a claim of priority is made to the above-disclosed application.

FIELD OF THE INVENTION

The object of the present invention is a joint assembly.
The object of the present invention is also a piece of furniture comprising said joint assembly.

BACKGROUND ART

In known solutions, the coupling between two tubular or box-like structural elements is obtained by making complementary projections and recesses on end portions of tubular structural elements which are interlocked, as shown, for example, in document U.S. Pat. No. 5,403,043. However, this type of solutions has the disadvantage of providing poor modularity, thus limiting the coupling configurations allowed to only substantially rectilinear joints.

Solutions of joint to be interposed between two or more tubular structural elements and comprising joint branches variously oriented in space and each suitable for being inserted in a tubular structural element, are also known. This type of joints allows modular framework structures to be formed. Known types of joints generally comprise joint branches suitable for being inserted with interference into the longitudinal cavities of the tubular structural elements so as to form a frictional fit.

This type of solution requires the application of an increased pressure for inserting the joint branch with interference into the longitudinal cavity of the tubular structural element. Therefore, only using joints of this type is disadvantageous when making a modular frame because the force to be applied for driving in a joint may create stresses and deformations in an already assembled portion of frame and at the same time, be laborious and not comfortable. Moreover, this type of coupling is unsuitable for successive assembling and disassembling because it wears out quickly.

Moreover, joints are known comprising locking keys in which a joint branch is provided with a key comprising cantilevered extensions, which key is inserted in a housing made in the walls of the longitudinal cavity of the tubular structural element, and in which said key, by rotating about the longitudinal axis thereof, is coupled with the cantilevered extensions thereof against surfaces of the housing, which conveniently are arranged undercut.

A solution of this type is disclosed for example, in document US-2010-014912. Although it is advantageous, such a solution has certain drawbacks because it makes difficult the related positioning of the tubular element and of the key, and indeed such a solution imposes the provision of an increased number of components. A similar solution is disclosed for example, in document US-2006-0278139, which shows a joint solution obtained on structural elements which with the truncated-conical surfaces thereof form a fit which promotes the related positioning of structural elements. Although it is partially advantageous, such a solution in any case has certain difficulties associated with making accurate conical abutment planes.

Further examples of joints comprising locking keys are known from DE-102005028573, US-2008-072515, WO-2013-187020 and U.S. Pat. No. 3,966,340.

The need is therefore felt to devise a solution for the drawbacks of the prior art mentioned hereto.

The need is felt to provide a solution of joint which is suitable for forming a joint, which can be reversed, coupled and disengaged in a simple manner while avoiding to provide fastening elements such as e.g., screws, and at the same time avoiding to use assembly tools while providing a certain positioning of the different elements of the joint.

SUMMARY OF THE INVENTION

It is an object of the present invention to provide a solution to the needs mentioned hereto with reference to the known art.

According to one aspect of the invention, a joint assembly comprises a structural body comprising at least a key which projects cantilevered from an abutment surface of said structural body, said key comprises a stem which extends along a key direction, said stem comprises a first stem portion having reduced transverse encumbrance and a second stem portion from which fins having predetermined circumferential extension project, said fins define a free end and locking surfaces opposite to said free end.

According to one aspect of the invention, said joint assembly further comprises a seat body which comprises an abutment counter-surface which can be placed facing said abutment surface, said seat body delimits at least a seat which is formed by opening from said abutment counter-surface, said abutment counter-surface delimiting at least an entry slot shaped so as to receive said key, said seat body delimits a first seat portion, proximal to said entry slot and having a reduced transverse extension suitable for allowing the insertion of the key when the fins are oriented aligned to said entry slot, said seat body delimits a second seat portion, internal and opposite to said entry slot, said second seat portion widens so as to allow the free rotation of the key about the key direction, said seat body, in switching from said first seat portion to said second seat portion, forms locking counter-surfaces arranged undercut with respect to said abutment counter-surface.

According to one aspect of the invention, said locking counter-surfaces have at least an inclined plane portion which moves away from the entry slot so that the key, by rotating in a screwing sense, brings said abutment surface in force-contact against said abutment counter-surface, thus creating a firm frictional fit.

According to one aspect of the invention, said structural body defines, with a portion thereof or an extension thereof, a longitudinal direction and said key direction is eccentric with respect to said longitudinal direction.

According to one aspect of the invention, said seat body further comprises a seat bottom wall which forms a resting counter-surface suitable for forming an abutment for said resting surfaces of said key.

According to one aspect of the invention, said joint assembly comprises an elastic element interposed between said resting surface and said resting counter-surface, said elastic element elastically biases, by moving away on said resting surface and said resting counter-surface, thus forcing said locking surfaces against said locking counter-surfaces.

According to one aspect of the invention, a piece of furniture comprises at least a joint assembly comprising at least a structural body and at least a seat body, which are coupled so as to form a framework structure, said piece of furniture further comprises at least a piece of furniture plane suitable for forming a piece of furniture surface, said at least a framework structure is suitable for supporting said piece of furniture plane.

According to one aspect of the invention, said piece of furniture comprises at least a magnet and at least a ferromagnetic portion so that said framework structure and said piece of furniture plane can be magnetically coupled, thus generating a magnetic attraction force, when they are at a given distance.

According to one aspect of the invention, said framework structure comprises a lever element constrained to said framework structure so that it is free to rotate about a fulcrum, said lever element comprises a handling portion suitable for being handled by an operator, and a working portion opposite to said handling portion with respect to said fulcrum, said lever element, due to a force exerted on said handling portion, switches from a resting position in which it does not interfere with said piece of furniture plane, to a working position in which it disengages said piece of furniture plane from said framework structure, thus giving said piece of furniture plane a sufficient thrust to overcome the magnetic attraction force and to move said piece of furniture plane away from said framework structure, thus bringing them to such a distance as to reduce the magnetic attraction force below a given threshold value.

According to one aspect of the invention, said piece of furniture is a piece of furniture for offices.

According to one aspect of the invention, said piece of furniture is a table.

BRIEF DESCRIPTION OF THE DRAWINGS

Further features and advantages of the assembly, the piece of furniture and the table according to the invention will be apparent from the description provided below of preferred embodiments thereof, given by way of non-limiting example, with reference to the accompanying drawings, in which:

FIG. 2A is an axonometric view which shows a piece of furniture comprising at least a joint assembly, according to one embodiment;

FIG. 3 shows the detail indicated by arrow III in FIG. 2A;

FIGS. 8A and 8B are diagrams with parts removed for clarity, which illustrate certain successive assembly steps of a piece of furniture comprising said joint assembly, according to one embodiment;

DETAILED DESCRIPTION OF PREFERRED EMBODIMENTS

Figure 1A:
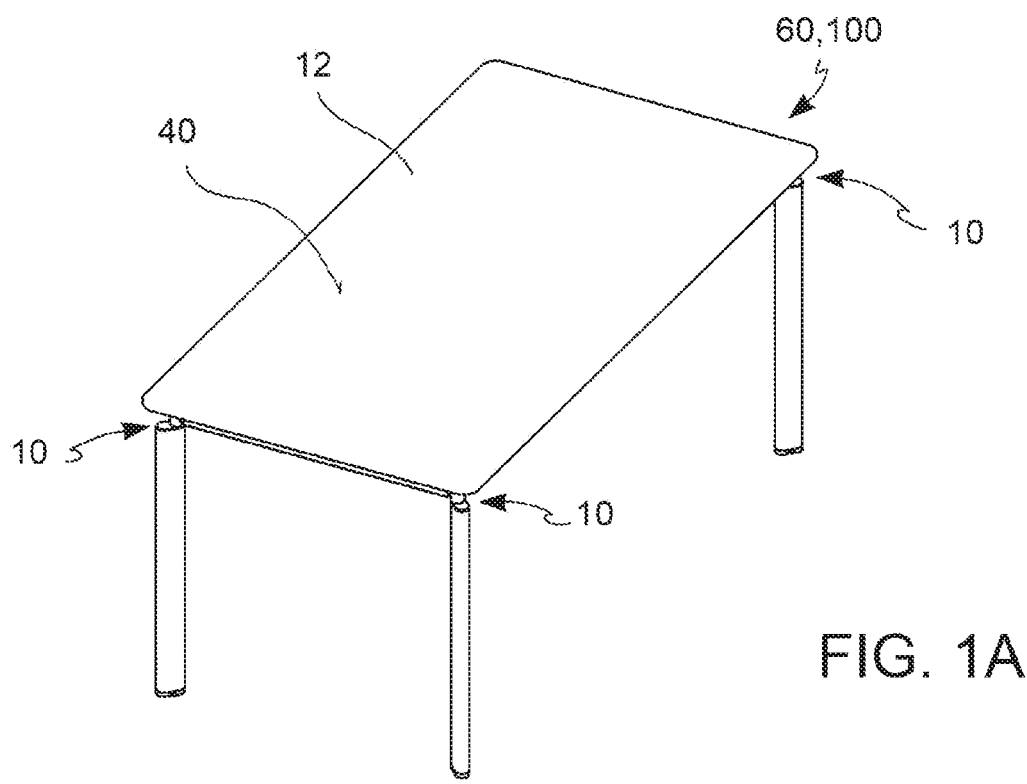
FIG. 1A is an axonometric view which shows a piece of furniture comprising at least a joint assembly, according to one embodiment.
Figure 1B:
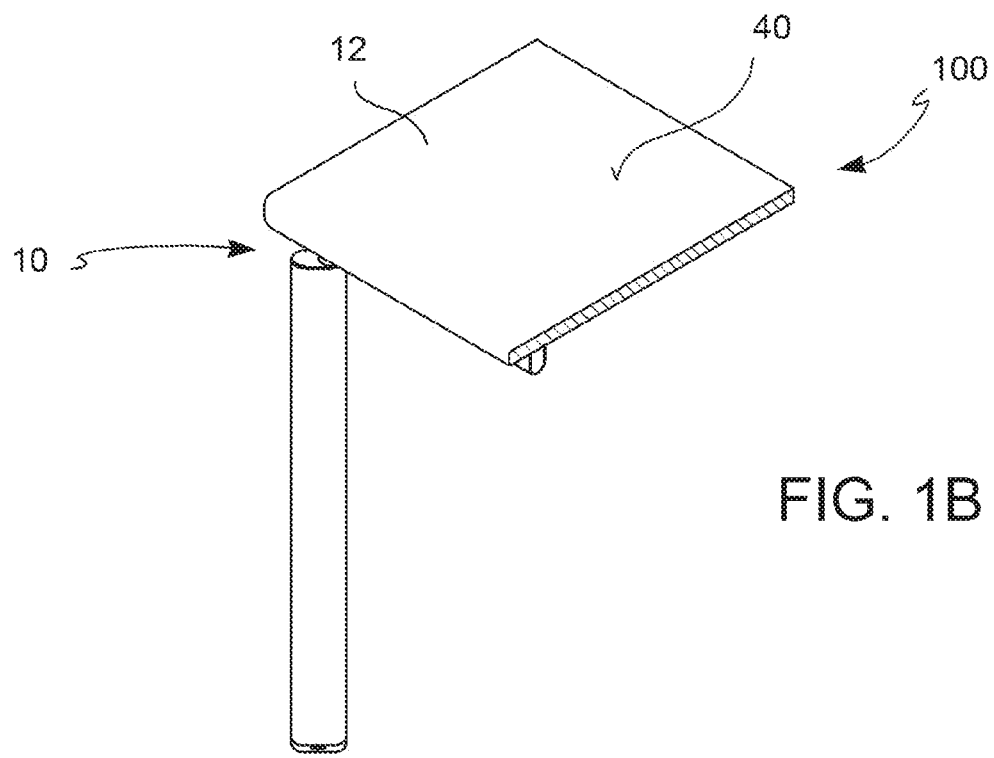
FIG. 1B is an axonometric view which shows a portion of a piece of furniture comprising a joint assembly, according to one embodiment.
Figure 2B:
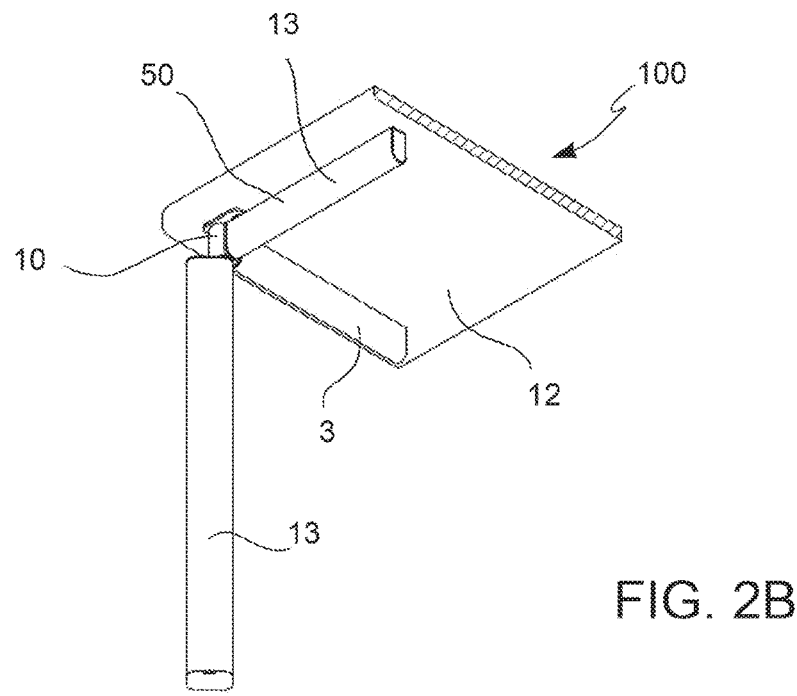
FIG. 2B is an axonometric view which shows a portion of a piece of furniture comprising a joint assembly, according to one embodiment.
Figure 4A:
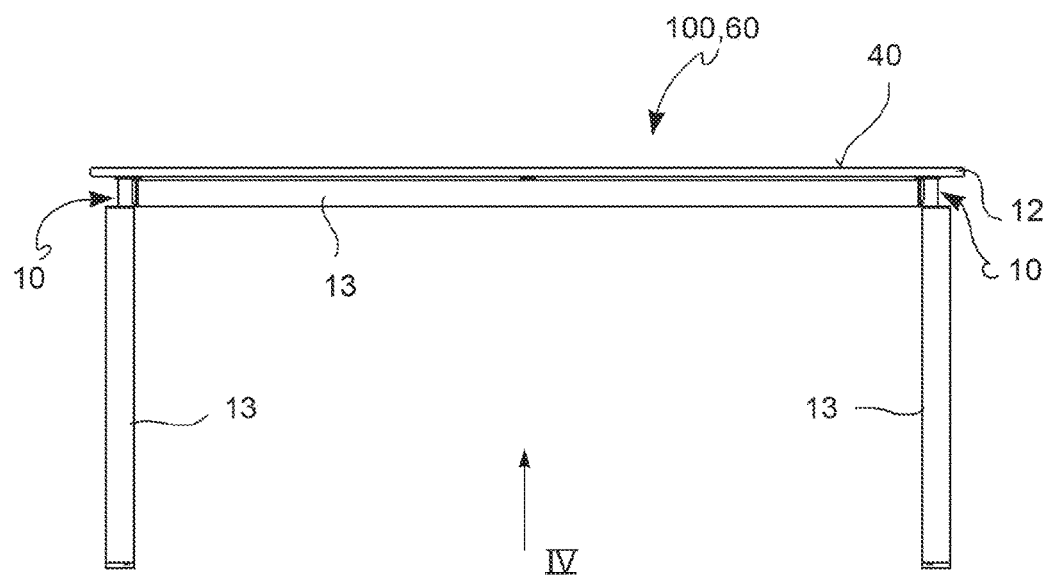
FIG. 4A is a raised view which shows a piece of furniture comprising at least a joint assembly, according to one embodiment.
Figure 4B:
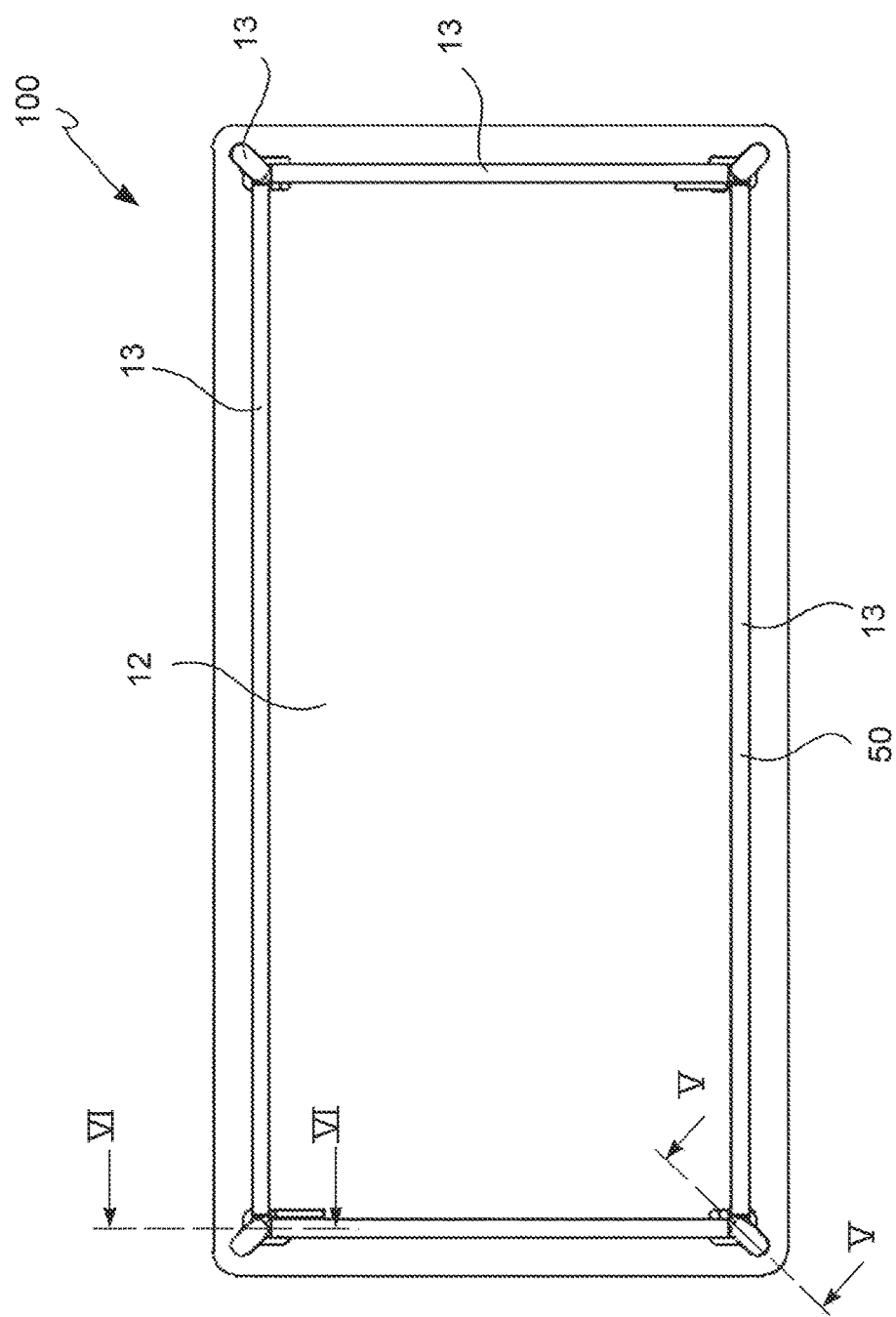
FIG. 4B is a plan view according to the viewpoint indicated with arrow IV in FIG. 4A.
Figure 5:
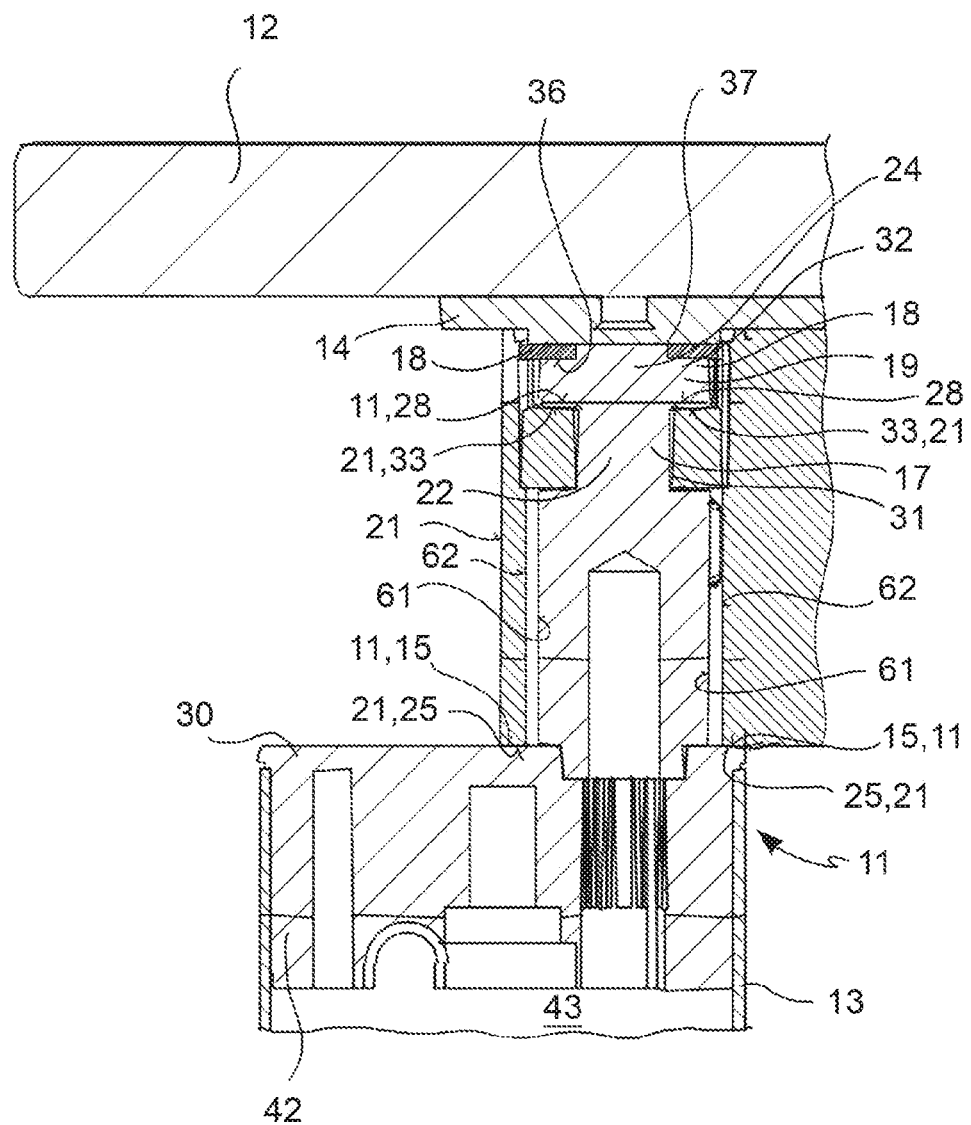
FIG. 5 is a sectional view of a joint assembly according to the cutting plane indicated with the arrows V-V in FIG. 4B.
Figure 6:
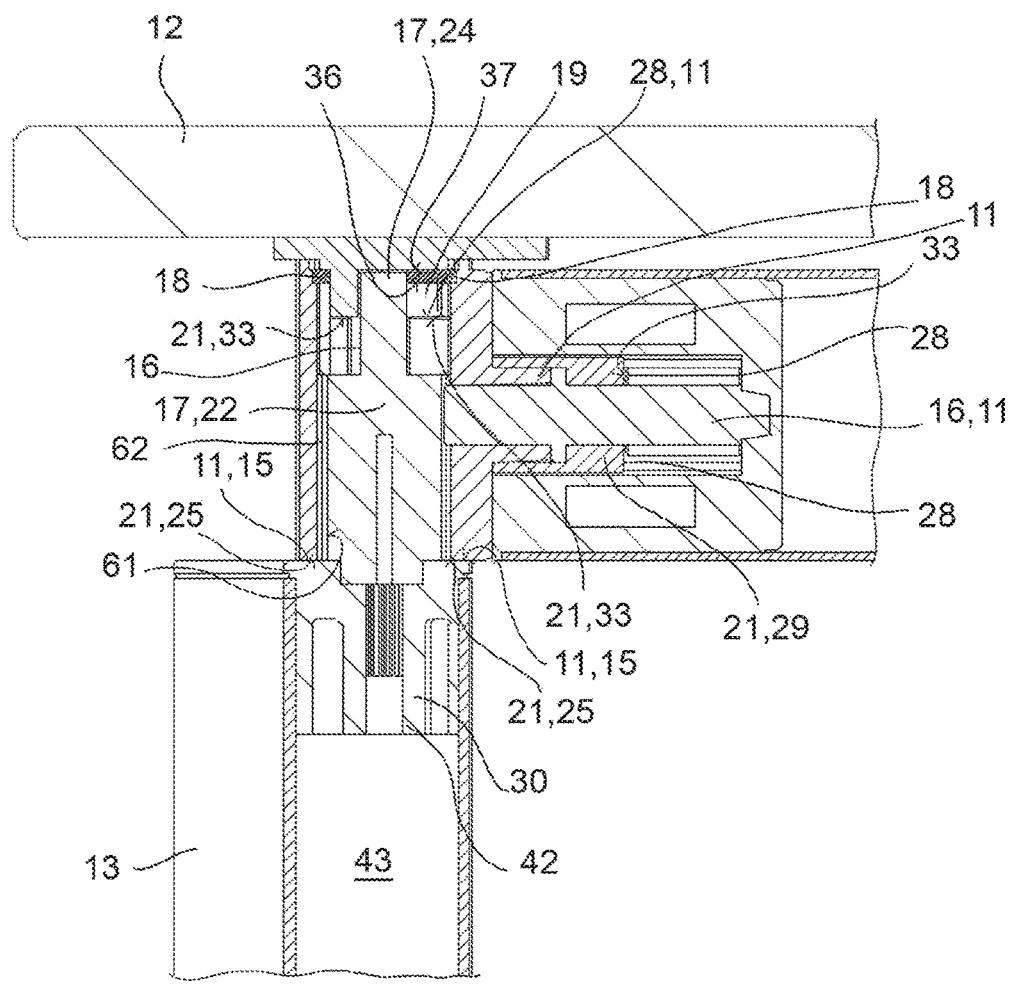
FIG. 6 is a sectional view of a joint assembly according to the cutting plane indicated with the arrows VI-VI in FIG. 4B.
Figure 7A:
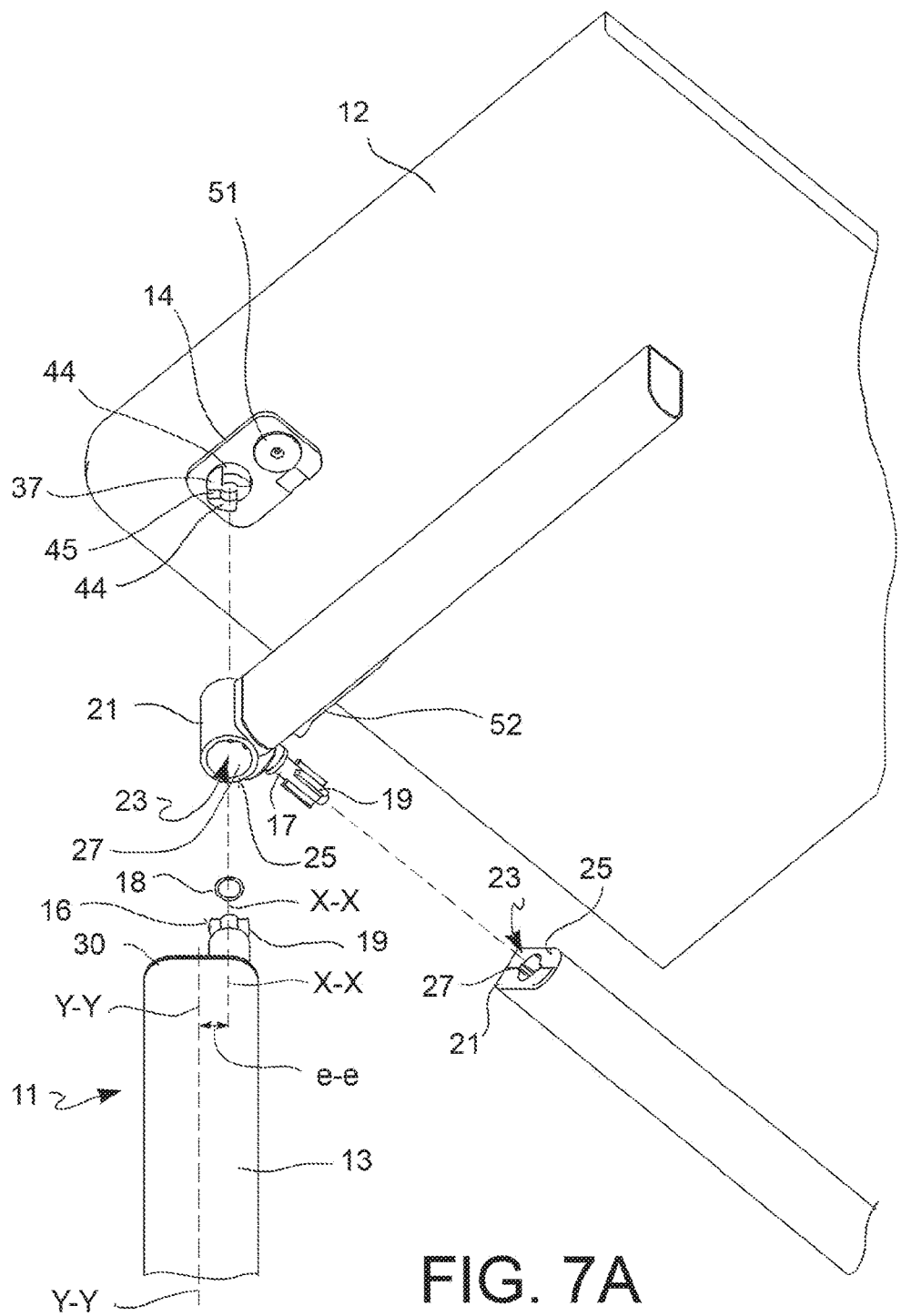
FIG. 7A is a perspective view and with separate parts, which shows a joint assembly and a portion of a piece of furniture, according to one embodiment.
Figure 7B:
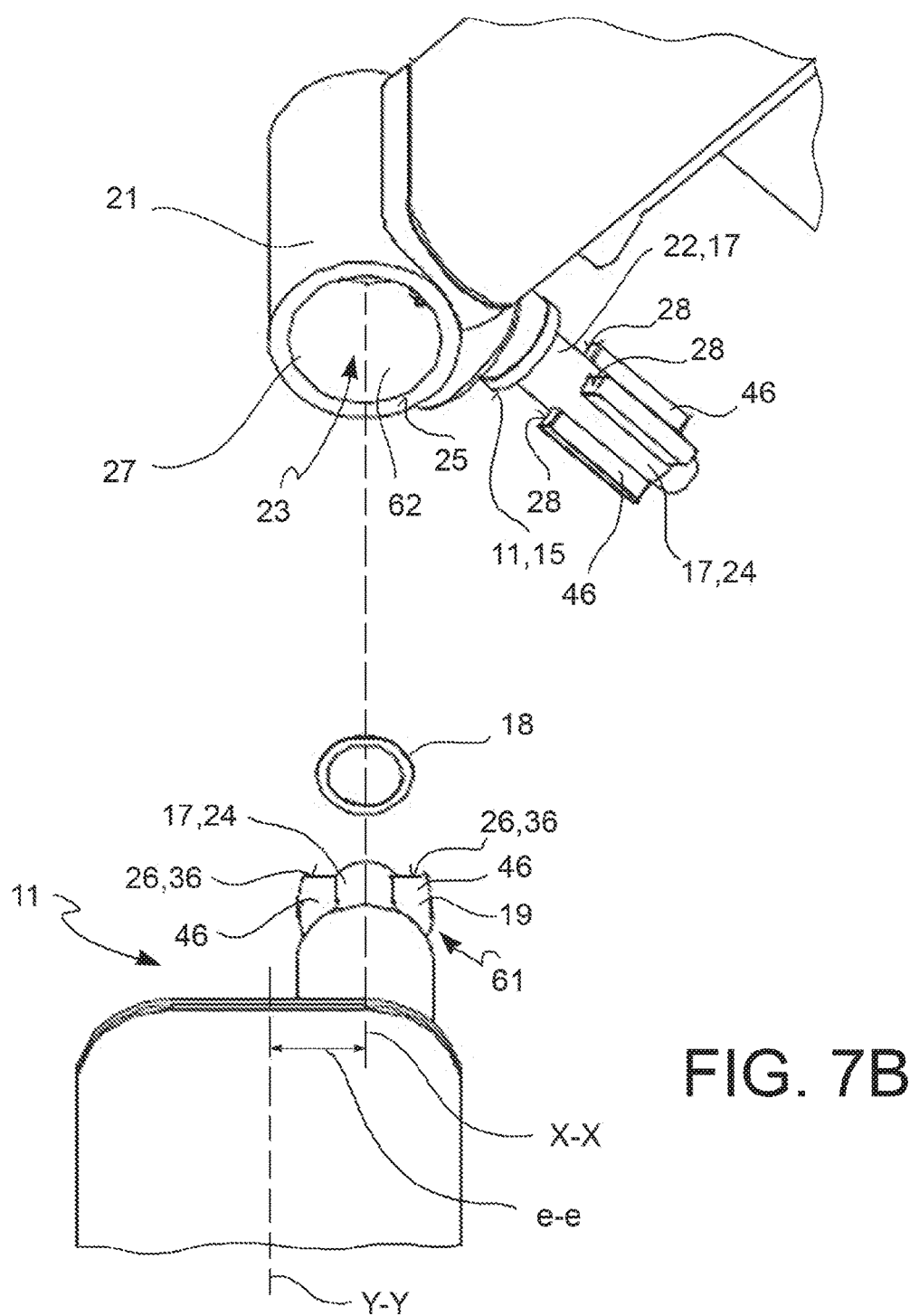
FIG. 7B is a perspective view and with separate parts, which shows a joint assembly, according to one embodiment.
Figure 9A:
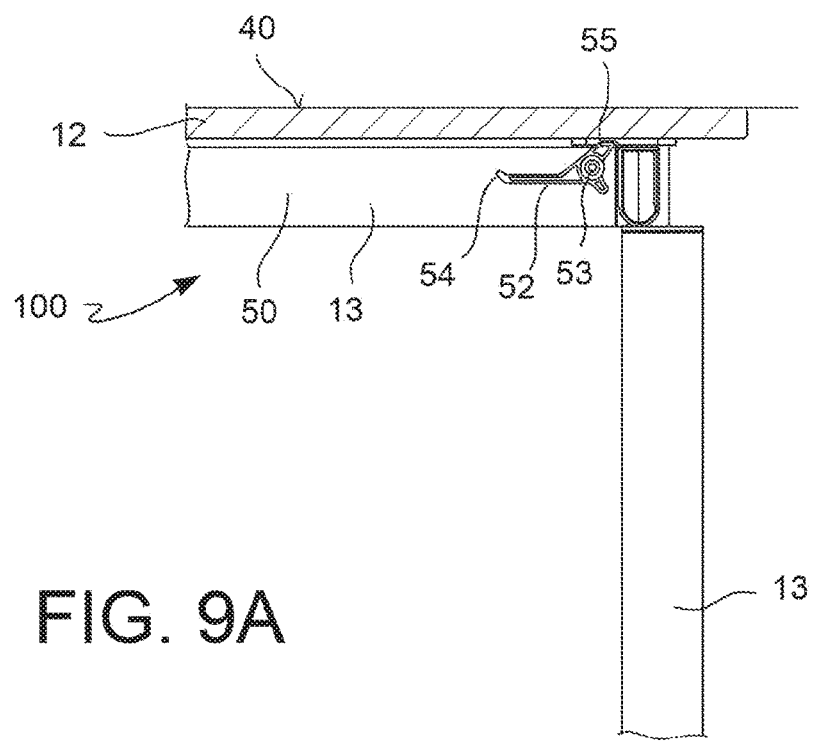
FIGS. 9A, 9B and 9C are diagrammatical sectional views of a portion of a piece of furniture comprising a joint assembly, according to one embodiment.
Figure 9B:
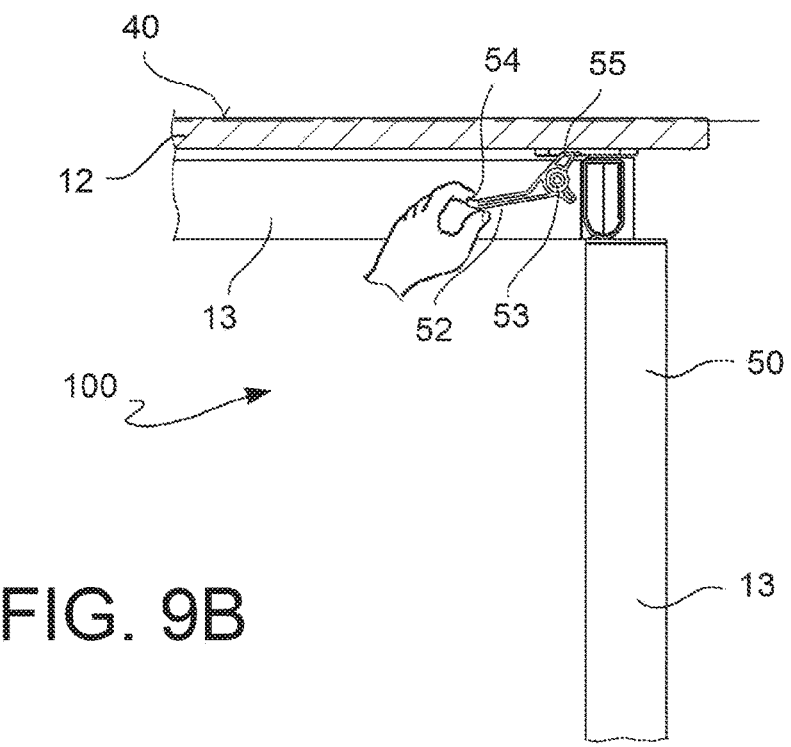
Figure 9C:
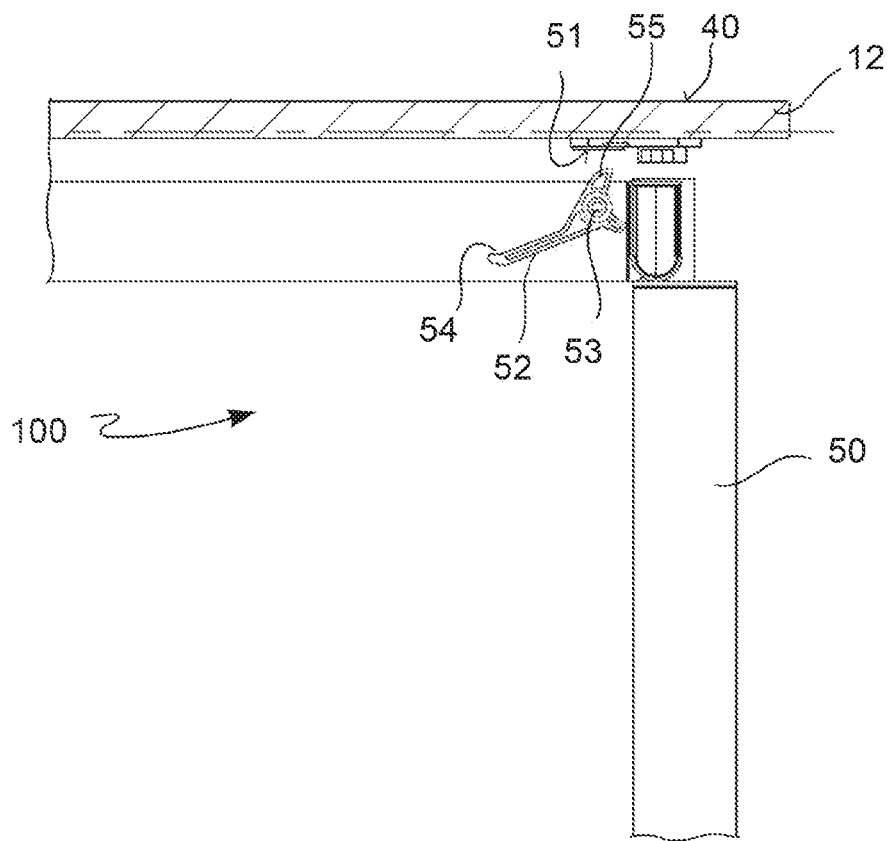
Figure 10:
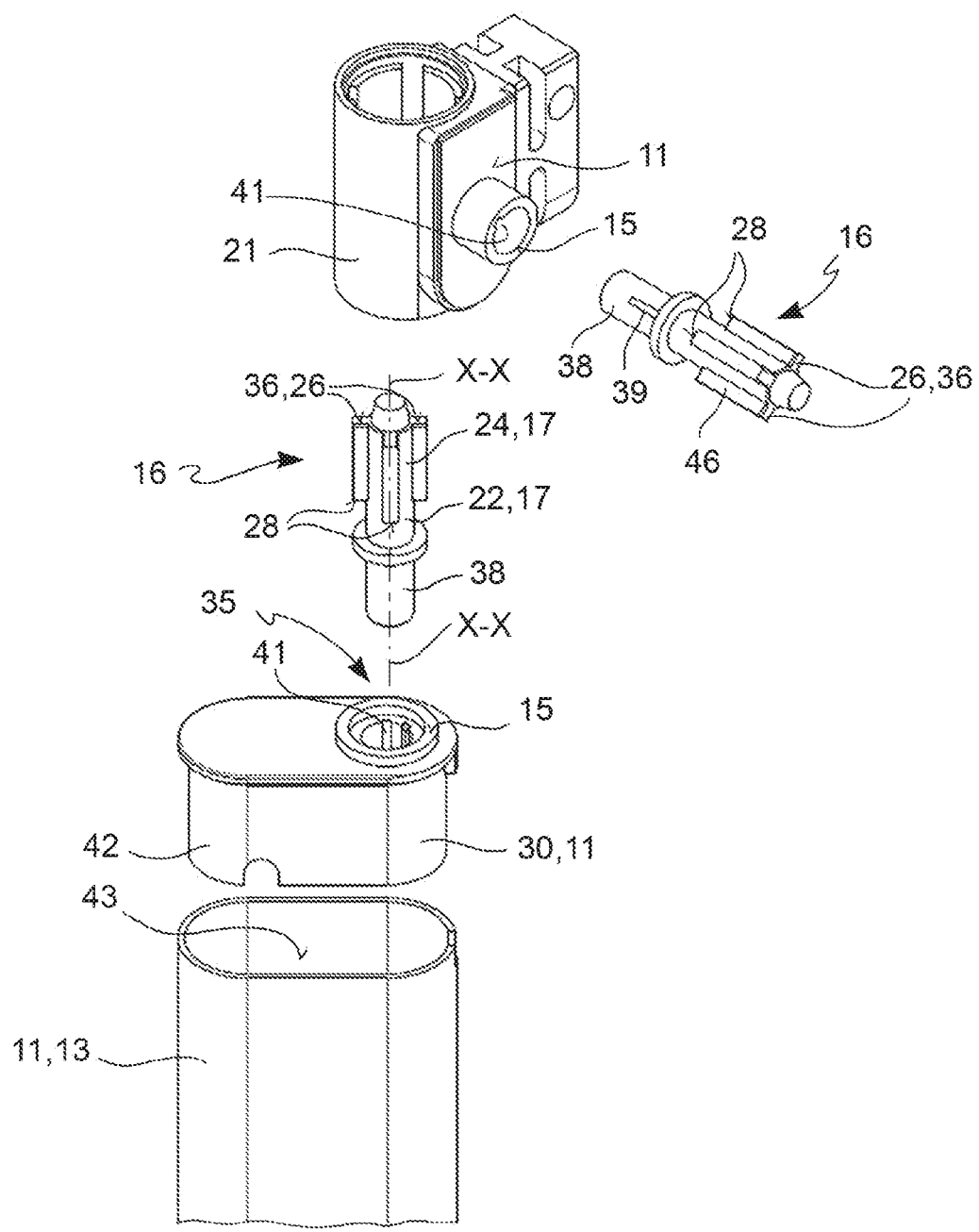
FIG. 10 is a perspective view and with separate parts, which shows a joint assembly, according to one embodiment.

According to a general embodiment of the invention, is provided a joint assembly 10.

According to a general embodiment of the invention, is provided a piece of furniture 100 comprising at least a joint assembly 10.

According to a general embodiment of the invention, is provided a table 60 comprising at least a joint assembly 10.

According to a general embodiment of the invention, is provided a framework structure 50 comprising at least a joint assembly 10.

Said joint assembly 10 comprises a structural body 11 comprising at least a key 16 which projects cantilevered from an abutment surface 15 of said structural body 11.

Said structural body 11 defines, with a portion thereof or an extension thereof, a longitudinal direction Y-Y substantially coinciding with the axis of longitudinal development of a structural element 13. According to one embodiment, said structural body 11 comprises a structural element 13 which extends along a main longitudinal direction Y-Y.

According to one embodiment, said structural element 13 is suitable for forming a framework structure 50, for example, said structural element 13 is a rod, a beam, a strut, a tie rod, a crosspiece or an upright.

Said key 16 comprises a stem 17 which extends along a key direction X-X. In other words, said key direction X-X substantially is coinciding with the direction of longitudinal extension of said stem 17. Such a key direction X-X comprises the rotation axis of said structural body 11.

Said stem 17 comprises a first stem portion 22 having a reduced transverse encumbrance. The term "transverse encumbrance" means the encumbrance in a direction substantially orthogonal to said key direction X-X. Moreover, a circumferential direction C-C is defined substantially orthogonal both to said key direction X-X and to said transverse direction. In other words, said circumferential direction C-C comprises the concentric circumferences having middle on said key direction X-X and which substantially extend in said transverse plane.

Said stem 17 comprises a second stem portion 24 from which fins 19 project having a predetermined circumferential extension.

Thereby, such fins define a shape of the key, in a transverse plane. Said transverse plane substantially is parallel to said transverse direction and is orthogonal to said key direction X-X.

According to one embodiment, said fins 19 have predetermined transverse extension. According to one embodiment, the shape of the key has a shape substantially having central symmetry.

According to one embodiment, each of said fins 19 is circumferentially spaced from a circumferentially successive fin 19 so that the shape of the key returns to said second stem portion 24.

Said fins 19 each define a free end 26 and locking surfaces 28 opposite to said free end 26.

According to one embodiment, said fins 19 comprise fins faces 46 which connect said free end 26 to said locking surfaces 28.

According to one embodiment, said free end 26 comprises at least a resting surface 36.

Said joint assembly 10 further comprises a seat body 21 which comprises an abutment counter-surface 25 which can be placed facing said abutment surface 15.

Said seat body 21 delimits at least a seat 23 which is formed by opening from said abutment counter-surface 25.

Said abutment counter-surface 25 delimits at least an entry slot 27 shaped so as to receive said key 16.

According to one embodiment, said entry slot 27 has shape and dimensions such as to substantially reproduce the shape of the key.

Said seat body 21 delimits a first seat portion 31 and a second seat portion 32.

Said first seat portion 31 is proximal to said entry slot 27 and has a reduced transverse extension suitable for allowing the insertion of key 16 when the fins 19 are oriented aligned with said entry slot 27.

Said second seat portion 32 is internal and opposite to said entry slot 27, and said second seat portion 32 widens so as to allow the free rotation of key 16 about the key direction X-X.

The term "proximal" means that said first seat portion 31 is in direct communication with said entry slot 27 but it is not necessarily interpenetrated with said entry slot. The term "internal" means that said second seat portion 32 is farther away from said entry slot 27 with respect to said first seat portion 32. In other words, the fins 19 of said key 16, by entering said seat 23, first encounter said first seat portion 31 and then said second seat portion 32. The term "widens" means that said second seat portion 32 has a transverse and circumferential extension such as to allow the free rotation of the fins 19 of said key 16 about the key direction X-X.

Said seat body 21, when passing from said first seat portion 31 to said second seat portion 32, forms locking counter-surfaces 33 arranged undercut with respect to said abutment counter-surface 25.

According to one embodiment, said seat body 21 comprises at least a locking insert 29 which comprises said locking counter-surfaces 33. According to one embodiment, said locking insert 29 is integral with said seat body 21.

According to one embodiment, said locking counter-surfaces 33 have at least an inclined plane portion 20 moving away from the entry slot 27 so that key 16, by rotating in a screwing sense V, brings said abutment surface 15 in force-contact against said abutment counter-surface 25, thus creating a firm frictional fit.

The expression "moving away from the entry slot" means that said inclined plane portion 20 has slope at least in direction parallel to the key direction X-X and that by travelling said locking surface 33 in said screwing sense V, the fins 19 are forced to move away from said entry slot 27.

The expression "frictional fit", from German "Reibschluss", means a fit by interference between two or more bodies, in which the entity of such an interference is sufficiently high so as to avoid mechanical clearances between said two or more bodies coupled by means of frictional fit. For example, at least one of said two or more bodies coupled by means of frictional fit may comprise bulges to create such an interference.

The provision of such an inclined plane portion 20 allows the mechanical clearances inside said joint assembly 10 to be significantly reduced.

The provision of said at least one inclined plane portion 20 allows said structural body 11 to be pulled so as to cause said abutment surface 15 and said abutment counter-surface 25 to push one against the other.

According to one embodiment, said key direction X-X is eccentric with respect to said longitudinal direction Y-Y.

According to one embodiment, said key direction X-X substantially is parallel to the longitudinal direction Y-Y and is not coinciding with said longitudinal direction Y-Y. In other words, said key direction X-X and said longitudinal direction Y-Y are separated by an eccentricity distance e-e.

Thereby, the rotation axis of said structural body 11 is coinciding with the key direction X-X. In other words, the rotation axis of said structural body 11 is not coinciding with the longitudinal direction Y-Y. Preferably, with the term "rotation axis" is intended to indicate the axis around which the structural body 11 rotates during the assembly or the disassembly of the joint assembly 10. Moreover, said key 16 is not positioned on the longitudinal axis of said structural element 13.

Advantageously, this allows a lever extension arm to be defined equal to said eccentricity distance e-e which favorably simplifies the assembly of said joint assembly 10. Indeed, said structural body 11 is rotated in the screwing sense V about the key direction X-X which, by not coinciding with the axis of said structural body 11, defines a lever arm which promotes the rotation in the screwing sense V. Similarly, the provision of such an eccentricity distance e-e favorably improves also the disassembly of said joint assembly 10. Indeed, said structural body 11 is rotated in the unscrewing sense, opposite to the screwing sense V, about the key direction X-X which, by not coinciding with the axis of said structural body 11, creates a lever arm, thus promoting the rotation also in the unscrewing sense.

According to an embodiment, said structural body 11 is not in axis with said key 16 so that said structural body 11 is suitable for screwing the key 16 by means of a rotation thereof for a portion of a turn around the key axis X-X.

According to an embodiment, said key direction X-X or a prolongation thereof and said longitudinal direction Y-Y cross said structural body 11.

According to an embodiment, said key direction X-X or a prolongation thereof and said longitudinal direction Y-Y both extend across a prevailing portion of the longitudinal encumber of said structural body 11.

According to an embodiment, said structural body 11 has encumber greater than or equal to said eccentricity distance e-e, in a direction parallel to said eccentricity distance e-e. In this way, both said key direction X-X or a prolongation thereof and said longitudinal direction Y-Y cross a prevailing portion of the longitudinal encumber of said structural body 11.

Thanks to the provision of such structural body 11, said structural element 13 and said eccentricity distance e-e, it is allowed to facilitate the rotation of the structural body 11 around the key axis X-X and at the same time to limit to the minimum flexional stresses and strains of the structural body 11, the structural element 13, as well as the key 16 and the key stem 17, as well as the seat body 21, during normal use of the joint assembly 10

According to an embodiment, said key direction X-X or a prolongation thereof and said longitudinal direction Y-Y cross said structural element 13. According to an embodiment, said key direction X-X or a prolongation thereof and said longitudinal direction Y-Y cross said structural element 13 substantially for the entire extension thereof along the longitudinal direction Y-Y.

According to one embodiment, said seat body 21 further comprises a seat bottom wall which forms a resting counter-surface 37 suitable for forming an abutment for said resting surfaces 36 of said key 16.

According to one embodiment, said joint assembly 10 comprises an elastic element 18 interposed between said resting surface 36 and said resting counter-surface 37.

According to one embodiment, said elastic element 18 elastically biases, by moving away, on said resting surface 36 and said resting counter-surface 37 by forcing said locking surfaces 28 against said locking counter-surfaces 33.

The provision of such an elastic element 18 allows the mechanical clearances inside said joint assembly 10 to be significantly reduced.

According to one embodiment, said structural body 11 comprises a substantially cylindrical engagement portion 61 which is inserted in an engagement seat 62 delimited by said seat body 21. Thereby, the walls of said engagement portion 61 act in conjunction with the walls of said engagement seat 62, thus avoiding the formation of mechanical clearances in the transverse plane.

According to one embodiment, an engagement portion 61 is sized so that it is inserted without clearance in said engagement seat 62.

The provision of said substantially cylindrical engagement portion 61 which is inserted in said engagement seat 62 advantageously allows the mechanical clearances in the transverse plane to be eliminated regardless of the depth of insertion, thus allowing for any mechanical clearances also along the key direction X-X to be compensated for.

According to one embodiment, said key 16 comprises said engagement portion 61.

According to one embodiment, said key stem 17 is coaxial with said engagement portion 61.

According to one embodiment, said structural body 11 is made in one piece. This allows the number of components of said joint assembly 10 to be reduced.

According to one embodiment, said structural body 11 is made in at least two separate pieces. This promotes the modularity of said joint assembly 10.

According to one embodiment, said structural body 11 comprises a structural element 13, a key 16 and a base body 40, made in a separate piece and coupled to one another with a geometrical fit. According to one embodiment, said structural body 11 comprises a structural element 13, a key 16 and a base body 30, made in a separate piece and coupled to one another with a frictional fit.

According to one embodiment, said structural element 13 delimit a longitudinal cavity 43. In other words, said structural element 13 is completely hollow. For example, said structural element 13 is a tubular structural element 13 or a box-like structural element 13. Preferably, said longitudinal cavity 43 extends for a prevailing portion of said structural element 13.

According to one embodiment, said structural body 13 comprises a base body 30 which comprises a base projection 42 which couples firmly with frictional fit inside the longitudinal cavity 43 of said structural element 13.

According to one embodiment, said base projection 42 comprises one or more bulges made of elastic or elastoplastic material, which are suitable for allowing, by elastically deforming, the insertion of the base projection 42 in the longitudinal cavity 43 and for causing the frictional fit once the base projection 42 is inserted in the longitudinal cavity 43. By acting on the size of such bulges, the interference may be modulated between base projection 42 and longitudinal cavity 43.

According to one embodiment, said base body 30 is integral with said structural element 13.

According to one embodiment, said base body 30 delimits a key hole 35 suitable for housing an engagement portion 38 of said key 16. According to one embodiment, said engagement portion 38 extends along the key direction X-X.

According to one embodiment, said engagement portion 38 of said key 16 is keyed inside said key hole 35.

According to one embodiment, said engagement portion 38 and said key hole 35 are reciprocally shaped so as to avoid the related rotation of said key 16 and base body 30 when said key 16 is inserted and rotated in said seat 23.

According to one embodiment, said engagement portion 38 of said key 16 comprises a locking tooth 39 suitable for engaging in a reciprocally shaped channel 41 delimited by at least a wall of said key hole 35.

According to one embodiment, said key 16 is integral with said base body 30.

According to one embodiment, said base body 30 is integral with said at least a seat body 21.

According to one embodiment, said locking surface 28 comprises, after said at least an inclined plane portion 20 along the screwing sense V, a substantially flat adjustment surface 36. Once the first structural element 11 is engaged in the seat body 21, this allows a further rotation of the joint assembly 10 to be made along the circumferential direction C-C to accurately finish the positioning of said structural body 11.

According to one embodiment, said at least one inclined plane portion 20 has a circumferential or angular extension lower than a quarter turn. In other words, said at least one inclined plane portion 20 has a circumferential or angular extension lower than 90°.

According to one embodiment, said seat body 24 comprises at least two circumferentially or angularly spaced locking surfaces 28, in which each locking surface 28 comprises at least an inclined plane portion 20.

According to one embodiment, said at least one inclined plane portion 20 has a slope along a direction parallel to the key direction X-X lower than 45°.

According to one embodiment, said seat body 21 comprises at least a cap 14 suitable for at least partially close said seat 23.

According to one embodiment, said cap 14 comprises said resting counter-surface 37.

According to one embodiment, said cap 14 comprises anti-rotation devices 44 which are interposed between two fins 19 of said key 16 when key 16 is inserted in said seat 23, said anti-rotation devices 44 comprise anti-rotation faces 45 suitable for forming abutments for said fins faces 46 so as to prevent a rotation backwards of said key 16.

According to one embodiment, said anti-rotation faces 45 are facing said fins faces 46 along the circumferential direction C-C.

According to one embodiment, said cap 14 is removable, suitable for being removed.

According to one embodiment, said elastic element 18 comprises at least a leaf spring.

According to one embodiment, said elastic element 18 comprises an undulated elastic ring.

According to one embodiment, said elastic element 18 comprises a damping element.

According to one embodiment, said joint assembly 10 comprises one or more structural bodies 11 and one or more seat bodies. Thereby, said joint assembly 10 is suitable for forming a multiple joint or an angle joint.

According to one embodiment, a piece of furniture 100 comprises at least a joint assembly 10 comprising at least a structural body 11 and at least a seat body 21, which are coupled so as to form a framework structure 50.

According to one embodiment, said piece of furniture 100 further comprises at least a piece of furniture plane 12 suitable for forming a piece of furniture surface 40.

According to one embodiment, said at least a framework structure 50 is suitable for supporting said piece of furniture plane 40.

According to one embodiment, said piece of furniture comprises at least a magnet 51 and at least a ferromagnetic portion, so that said framework structure 50 and said piece of furniture plane 12 can be magnetically coupled, thereby generating a magnetic attraction force, when they are at a given distance.

According to one embodiment, said framework structure 50 comprises a lever element 52 constrained to said framework structure 50 so that it can freely rotate about a fulcrum 53.

According to one embodiment, said lever element 52 comprises a handling portion 54 suitable for being handled by an operator, and a working portion 55 opposite to said handling portion 54 with respect to said fulcrum 53.

According to one embodiment, due to a force exerted on said handling portion 54, said lever element 52 switches from a resting position in which it does not interfere with said piece of furniture plane 12, to a working position in which it disengages said piece of furniture plane 12 from said framework structure 50, thus giving said piece of furniture plane 12 a sufficient thrust to overcome the magnetic attraction force and to move said piece of furniture plane 12 away from said framework structure 50, thus bringing them to such a distance as to reduce the magnetic attraction force below a given threshold value.

Thereby, said piece of furniture may be disassembled while avoiding to use tools or mechanical fastening means such as screws or rivets.

According to one embodiment, said lever element 52 rotates eccentrically with respect to said fulcrum 53.

According to one embodiment, said handling portion 54 is positioned farther away from fulcrum 53 with respect to said working portion 56, so as to favorably transfer the torque applied to said handling portion 54, to said piece of furniture plane 12.

By conveniently sizing the distance between handling portion 54 and fulcrum 53, this allows the thrust exerted by said working portion 55 against said piece of furniture plane 12, to be modulated.

According to one embodiment, said piece of furniture 100 is a modular piece of furniture 100. By way of non-limiting example, said piece of furniture 100 is a desk, a table, a bookcase, shelving.

According to one embodiment, said piece of furniture 100 is a piece of furniture for offices.

According to one embodiment, said framework structure 50 comprises at least a ferromagnetic portion.

According to one embodiment, said joint assembly 10 is at least partially made of ferromagnetic material. According to one embodiment, said joint assembly 10 is mainly made of ferromagnetic material.

According to one embodiment, said cap 14 comprises said at least one magnet 51.

According to one embodiment, said cap 14 is integral with said piece of furniture plane 12.

According to one embodiment, said cap 14 is integral with said piece of furniture plane 12.

For example, said cap 14 is glued to said piece of furniture plane 12.

The provision of said cap 14 is integral with said piece of furniture plane 12, allows a self-centering piece of furniture plane to be made so as to simplify the assembly process between piece of furniture plane and framework structure 50.

According to one embodiment, said piece of furniture 100 comprises several extendable telescopic legs.

According to an embodiment, a piece of furniture 100, for example a table 60, comprises at least a joint assembly 10 as described in any one of the preceding embodiments, wherein said structural body of the joint assembly 10 is directly or indirectly associated to a structural element 13 extending along the longitudinal direction Y-Y to form an element for resting on floor, for example a leg of the table 60, or an upright of the piece of furniture 100, and wherein said key direction X-X or a prolongation thereof extending parallel to said longitudinal direction Y-Y and separated therefrom by said eccentricity distance e-e, across a prevailing portion of the longitudinal encumber of said structural element 13.

In this way, it is possible to realize a key 16 which is eccentric in respect of the structural element 13, without imposing for this reason flexural stresses and strains on the joint assembly 10, flexural stresses and strains that could compromise the functionality of at least some parts of the joint assembly 10.

According to an embodiment, said structural element 13 extends, in a plane transversal to said longitudinal direction Y-Y, externally with respect to the encumber of said piece of furniture plane 12.

Due to the above-described features provided separately from, or together with one another in particular embodiments, an assembly may be obtained which simultaneously meets the above-described contrasting needs and the above-mentioned desired advantages, and in particular:

said joint assembly 10 may be assembled and disassembled, and also said piece of furniture 100 comprising at least a joint assembly 10, thus avoiding to use assembly tools and also fastening means;

a piece of furniture is provided with increased structural stability;

the mechanical clearances inside said joint assembly 10 may be significantly reduced;

a piece of furniture characterized by extreme modularity is made;

it is possible to realize a joint assembly 10 as well a piece of furniture 100, for example a table 60, wherein the key 16 of the joint assembly 10 is eccentric in respect of the structural body 11 of the joint assembly 10, without for this reason overstress in flexure the joint assembly.

A person skilled in the art may make many changes, adaptations and replacements to the embodiments described above or can replace elements with others which are functionally equivalent in order to satisfy contingent needs without however departing from the scope of protection of the appended claims.

LIST OF REFERENCES

10 Joint assembly
11 Structural body

12 Work surface
13 Structural element, or tubular element, or box-like element
14 Piece of furniture plane
15 Abutment surface
16 Key
17 Stem
18 Elastic element
19 Fins
20 Inclined plane portion
21 Seat body
22 First stem portion
23 Seat, or key seat
24 Second stem portion
25 Abutment counter-surface
26 Free end of fin
27 Entry slot
28 Locking surface
29 Locking insert
30 Structural body insert
31 First seat portion
32 Second seat portion
33 Locking counter-surface
34 Adjustment portion
35 Key hole
36 Resting surface
37 Resting counter-surface
38 Key engagement portion
39 Locking tooth
40 Piece of furniture surface
41 Channel
42 Base projection
43 Longitudinal cavity
44 Anti-rotation device
45 Anti-rotation faces
46 Fin faces
50 Framework structure
51 Magnet
52 Lever element
53 Fulcrum
54 Handling portion
55 Working portion
60 Table
61 Engagement portion
62 Engagement seat
100 Piece of furniture
X-X Key direction
Y-Y Longitudinal direction
C-C Circumferential or angular direction
V Screwing sense
e-e Eccentricity distance

The invention claimed is:

1. A joint assembly comprising:
a structural body comprising:
a key projecting cantilevered from an abutment surface of said structural body;
said key comprises a stem extending along a key direction;
said stem comprises a first stem portion having a reduced transverse encumbrance, and a second stem portion from which fins project having a predetermined circumferential extension;
said fins define a free end and locking surfaces opposite to said free end;
a seat body comprising an abutment counter-surface which can be placed facing said abutment surface;
said seat body defines a seat, formed by opening from said abutment counter-surface, said abutment counter-surface delimiting an entry slot shaped so as to receive said key;
said seat body defines a first seat portion proximal to and on a first side of said entry slot and having a reduced transverse extension, allowing the insertion of the key when the fins are oriented aligned with said entry slot;
said seat body defines a second seat portion which is on a second side of said entry slot and further from said entry slot than said first seat portion, said second seat portion widens so as to allow the free rotation of the key around the key direction;
said seat body, widens when passing from said first seat portion to said second seat portion, forms locking counter-surfaces recessed with respect to said abutment counter-surface;
wherein said locking counter-surfaces have an inclined plane portion extending away from the entry slot so that the key, by rotating, brings said abutment surface in contact against said abutment counter-surface, thereby creating an interference fit.

2. The joint assembly according to claim 1, wherein said structural body defines, with a portion thereof or an extension thereof, a longitudinal direction, substantially coinciding with an axis of longitudinal extension of a structural element, and wherein said key direction is eccentric with respect to said longitudinal direction.

3. The joint assembly according to claim 1, wherein said key direction or a prolongation thereof and said longitudinal direction both extend across a greater portion of a longitudinal extension of said structural body.

4. The joint assembly according to claim 1, wherein said key direction and said longitudinal direction are separated by a distance, and wherein said structural body has an extension greater than or equal to said distance, in a direction parallel to said distance.

5. A piece of furniture comprising a joint assembly in accordance with claim 4.

6. The piece of furniture according to claim 5, wherein said piece of furniture is a modular piece of furniture.

7. The piece of furniture according to claim 5, wherein said structural body of the joint assembly is associated to a structural element extending along the longitudinal direction to form an element for resting on floor, and wherein said key direction or a prolongation of said key direction extends parallel to said longitudinal direction and is separated therefrom by said distance, across a greater portion of the longitudinal extension of said structural element.

8. The joint assembly according to claim 1, wherein said seat body comprises a seat bottom wall forming a resting counter-surface for forming an abutment for a resting surfaces of said key.

9. The joint assembly according to claim 1, wherein said structural element defines a longitudinal cavity.

10. The joint assembly according to claim 1, wherein said seat body comprises a cap at least partially closing said seat;
wherein said cap comprises said resting counter-surface; and
wherein said cap comprises an anti-rotation device interposing between two fins of said key, when the key is inserted in said seat, said anti-rotation device comprises anti-rotation faces acting as abutments for said fins faces, so as to prevent a rotation backwards of said key.

11. The joint assembly according to claim 1, wherein said inclined plane portion has a circumferential or angular extension less than a
one fourth rotation.

12. The joint assembly according to claim 1, wherein said joint assembly comprises one or more structural bodies and one or more seat bodies.

13. A table comprising a joint assembly according to claim 1.

14. The joint assembly according to claim 1, wherein said joint assembly comprises an elastic element interposed between said resting surface and said resting counter-surface; and wherein said elastic element elastically biases, by moving away, on said resting surface and said resting counter-surface, thereby forcing said locking surfaces against said locking counter-surfaces.

15. The joint assembly according to claim 1, wherein said locking surface comprises, after said inclined plane portion along a rotational direction, a substantially flat adjustment surface.

\* \* \* \* \*